(12) United States Patent
Kim

(10) Patent No.: US 7,817,067 B2
(45) Date of Patent: Oct. 19, 2010

(54) APPARATUS FOR SENSING BUTTON-PRESSED STATE AND METHOD THEREFOR IN MOBILE DEVICE

(75) Inventor: Jae-Eung Kim, Gyeonggi-Do (KR)

(73) Assignee: LG Electronics Inc., Seoul (KR)

(*) Notice: Subject to any disclaimer, the term of this patent is extended or adjusted under 35 U.S.C. 154(b) by 1054 days.

(21) Appl. No.: 11/183,866

(22) Filed: Jul. 19, 2005

(65) Prior Publication Data

US 2006/0016674 A1  Jan. 26, 2006

(30) Foreign Application Priority Data

Jul. 20, 2004  (KR) .................. 10-2004-0056569

(51) Int. Cl.
*G06F 13/00* (2006.01)
(52) U.S. Cl. .................. 341/22; 345/167; 345/168; 345/169; 379/368
(58) Field of Classification Search .............. 341/22; 379/368; 345/164, 167, 168, 169
See application file for complete search history.

(56) References Cited

U.S. PATENT DOCUMENTS 6,571,086 B1 * 5/2003 Uusimaki .................. 455/90.3

FOREIGN PATENT DOCUMENTS

JP   2000-059481 A   2/2000
JP   2000-353452 A   12/2000

* cited by examiner

*Primary Examiner*—Brian A. Zimmerman
*Assistant Examiner*—Hung Q Dang
(74) *Attorney, Agent, or Firm*—Birch, Stewart, Kolasch & Birch, LLP

(57) ABSTRACT

An apparatus for sensing a button-pressed state in a mobile device comprising a switch unit formed by combining rotary switches in a switch unit and a controller connected to the rotary switches within the switch unit, for sensing a switching operation according to a connected state between contact points of the rotary switches. The controller senses the connected state between the contact points of the rotary switches through an input/output port, and recognizes a rotating direction, an operation order, and a number of rotations of the rotary switches on the basis of the connected state. The controller determines if the switching operation is intended or not so that a desired operation corresponding to the switching operation is performed only if the operation is intended to thereby save battery power by minimizing performing unintended operation.

8 Claims, 4 Drawing Sheets

APPARATUS FOR SENSING BUTTON-PRESSED STATE AND METHOD THEREFOR IN MOBILE DEVICE

PRIORITY

This nonprovisional application claims priority under 35 U.S.C. §119(a) on Patent Application No. 56569/2004 filed in Korea on Jul. 20, 2004, which is herein incorporated by reference.

BACKGROUND OF THE INVENTION

1. Field of the Invention

The present invention relates to a mobile device, and particularly, to a switch unit for sensing a switched state of switch contact points by rotation, and a method for sensing a button-pressed state using the same.

2. Description of the Related Art

Recently, terminals having various performances have been available due to dramatic development in radio communications technologies. As a result, users have access to various multimedia services, additional functions and wireless Internet by using the high-functional mobile communications terminals.

FIG. 1 is a perspective view showing a mobile communications terminal according to a related art.

As shown, the mobile communication terminal of the related art includes a keypad unit 20 having various menu keys, functional keys, and number keys formed on a surface of a mobile communications terminal and two push switches 21a and 21b formed at one side surface thereof. The respective two push switches 21a and 21b, as shown in FIG. 2, are connected to a GPIO (General Purpose Input Output) port of an inner CPU (Central Processing Unit).

When a folder of the terminal is opened, a user operates the keypad unit 20 and the two push switches 21a and 21b to access various services, additional functions, wireless Internet, and the like. When the folder is closed, the user operates the two push switches 21a and 21b to work a camera, a backlight, and the like. For instance, the push switch 21a could be used for moving a menu selecting cursor up and the push switch 21b could be used for moving the cursor down. The push switches 21a and 21b could also be used for working the camera to take photographic images or to turn on the backlight by pressing it for a certain amount of time.

When the user presses the push switches 21a and 21b, as shown in FIG. 2, the switch contact points connect to each other. The CPU periodically measures a logical state of the GPIO port connected to the switch contact points to thereby recognize the switching operation.

However, in the related art mobile communications terminal, the CPU can not recognize whether the external push switches are purposefully pressed by the user or accidentally pressed, for example when the terminal is in a pocket or a bag. As a result, when the external push switch is pressed regardless of the user's intention, the CPU operates the camera, the backlight, or other such items corresponding to the pressed push switch. As a result, unnecessary consumption of a battery power occurs by performing unintended functions.

SUMMARY OF THE INVENTION

Therefore, it is an object of the present invention to provide an apparatus for sensing a button-pressed state and a method therefore in a mobile device capable of reducing unnecessary battery consumption caused by unintended pressing of the external switches.

It is another object of the present invention to provide an apparatus for sensing a button-pressed state and a method therefore in a mobile device capable of precisely recognizing an external switching operation as intended by a user.

To achieve these and other advantages and in accordance with the purpose of the present invention, as embodied and broadly described herein, an apparatus is provided for sensing a button-pressed state in a mobile device comprising a plurality of rotary switches and a controller connected to the plurality of rotary switches. The controller may sense a switching operation according to a connection pattern of the rotary switches.

The rotary switch may include a disc-shaped rotating member, a contact point rotary having a plurality of wings with a constant interval in a radial direction, a rotary axis fixedly inserted into the rotating member and a penetration hole of the contact point rotary, and a contact point switch by which the switch contact points are switched on and off according to the rotation of the wings of the contact point rotary.

The controller may be configured to determine a switching operation according to a rotating direction, an operation order, and the number of rotations of the plurality of the rotary switches. The controller may determine the switching operation as being valid only when the plurality of rotary switches are continuously operated in sequence for more than a predetermined number of times in a same direction.

According to another embodiment of the present invention, a method is provided for sensing a button-pressed state in a mobile device which includes a switch unit having a plurality of rotary switches and a controller connected to the switch unit through an input/output port, wherein the method comprises sensing a connected state between contact points of the plurality of rotary switches provided in the switch unit through the input/output port, and determining a switching operation by recognizing at least one of a rotating direction, an operation order, and a number of rotations of the plurality of rotary switches on the basis of the sensed connected state between the contact points.

In the determining step, the controller may determine the switching operation as being valid only when the plurality of rotary switches are continuously operated in sequence for more than a predetermined number of times in the same direction.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

In the present invention, a plurality of rotary switches operated by rotation may be formed in a single switch unit. Also, a controller may be formed to determine that a switching operation, by a user as being valid only when the plurality of rotary switches are continuously operated in a sequence for more than a predetermined number of times in the same direction.

In this case, the controller may determine (judge) a direction (one of upward/downward and/or right/left directions) of the switching operation based on an order of operation of the plurality of switches. The controller also may determine an operation of each switch based on a number of times that a logical state is varied when the switches are operated. The switches may be positioned outside of the mobile device. The controller, in general, may sense the switching operation as being valid or not according to a pattern of operation of the plurality of rotary switches.

Figure 1:
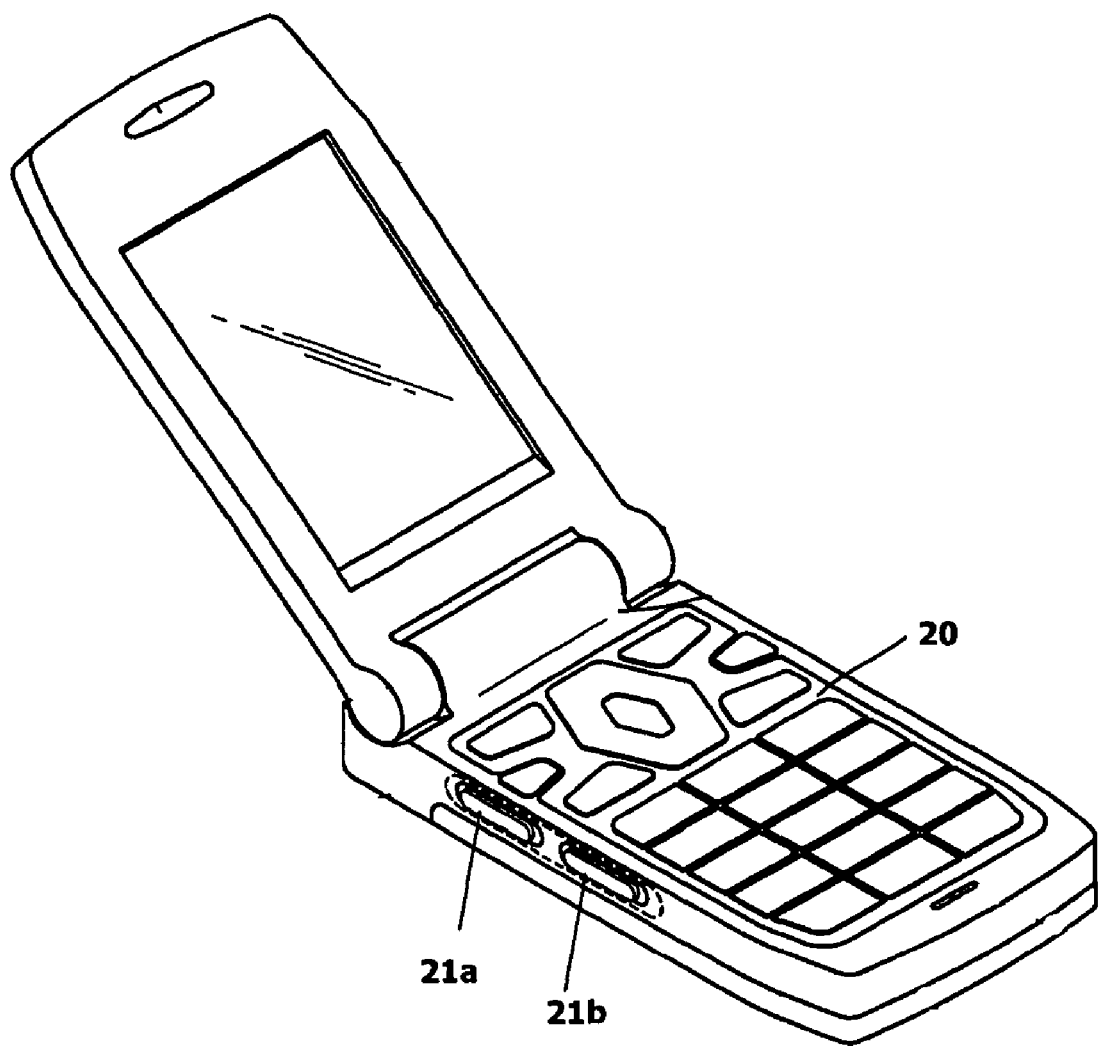
FIG. 1 is a perspective view of a mobile communications terminal according to a related art.
Figure 2:
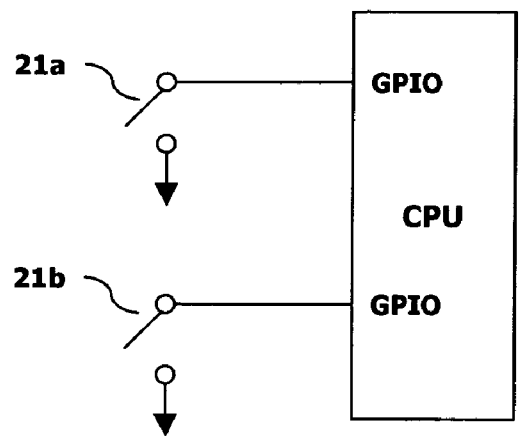
FIG. 2 is a diagram illustrating a connection between push switches and a CPU in FIG. 1.
Figure 3:
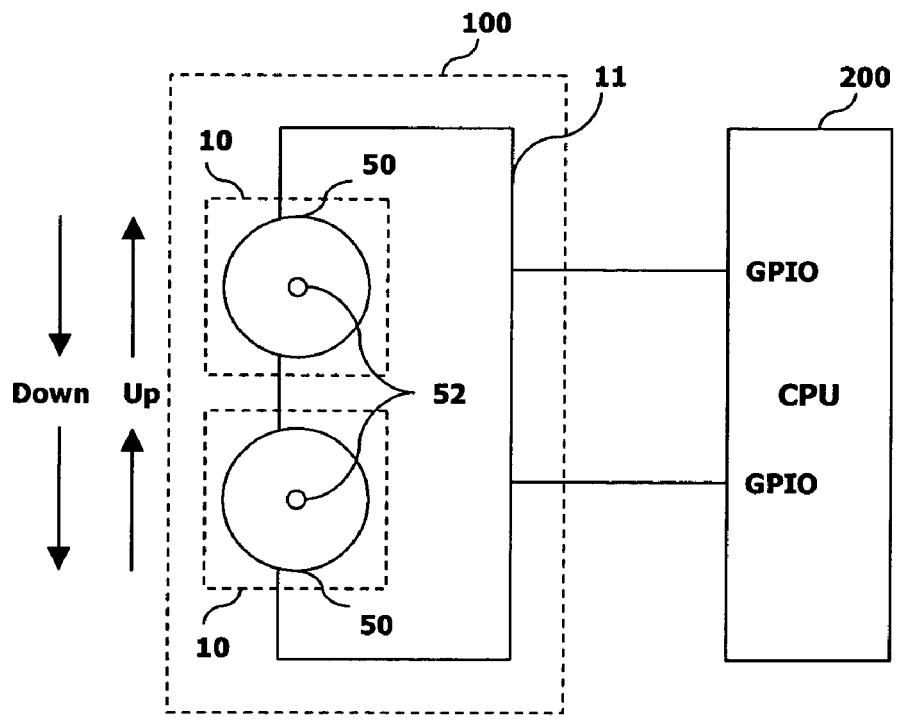
FIG. 3 illustrates a configuration of an apparatus for sensing a button-pressed state in a mobile device according to an embodiment of the present invention.

FIG. 3 is a schematic diagram showing an apparatus for sensing a button-pressed state in a mobile device according to an embodiment of the present invention. For simplicity, two rotary switches are illustrated. However, it should be noted that the invention is applicable to situations in which more than two rotary switches are provided. The invention is also applicable in certain situations in which a single rotary switch is provided. Also, while a mobile communication terminal is illustrated, the present invention is applicable to any devices, such as PDAs and MP3 players, where mobility is desired.

As shown in FIG. 3, an apparatus for sensing a button-pressed state according to the embodiment of the present invention may include a switch unit 100 mounted in a lateral surface of the mobile device. The apparatus may also include a controller 200 for sensing the switching operation according to a connected state of the switch unit 100. The controller 200 may include a CPU (Central Processing Unit) or be connected to the CPU.

The switch unit 100 may include a plurality of rotary switches 10, such as two, of which switch contact points (described below) can be switched on and off by rotation. The switch unit 100 may also include a substrate 11.

Figure 4:
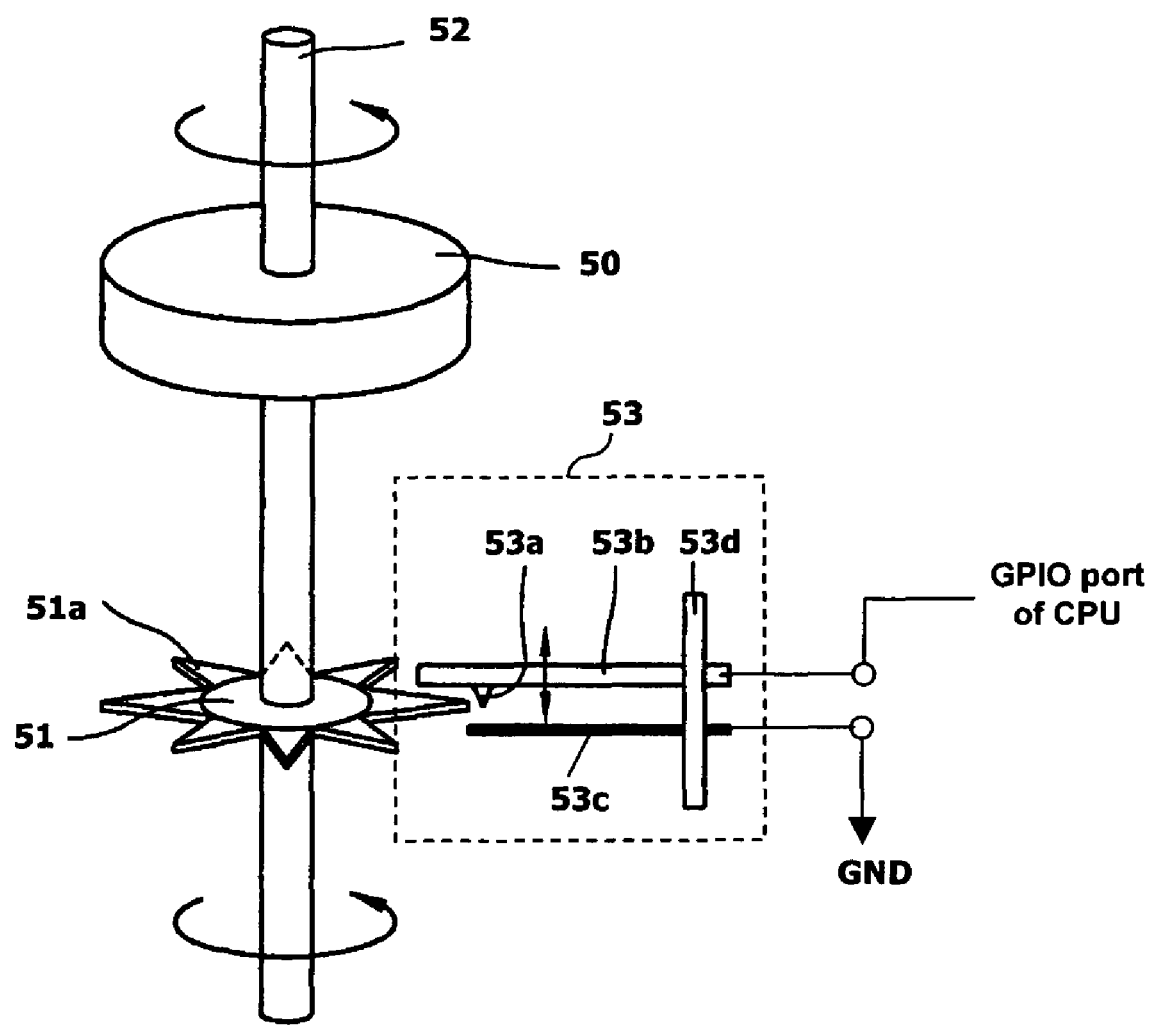
FIG. 4 is a detailed schematic diagram showing each rotary switch in FIG. 3.

As illustrated in FIG. 4, each rotary switch 10 may include a rotating member 50 and a contact point rotary 51 having a plurality of wings 51a with a constant interval in a radial direction. Either or both of the rotating member 50 and the contact point rotary 51 may be disc-shaped. The rotary switch 10 may also include a rotary axis 52 fixedly inserted into the rotating member 50 and a penetration hole of the contact point rotary 51. The rotary switch 10 may further include a contact point switch 53 which can be switched on and off by the rotation of the wings 51a of the contact point rotary 51.

Figure 5:
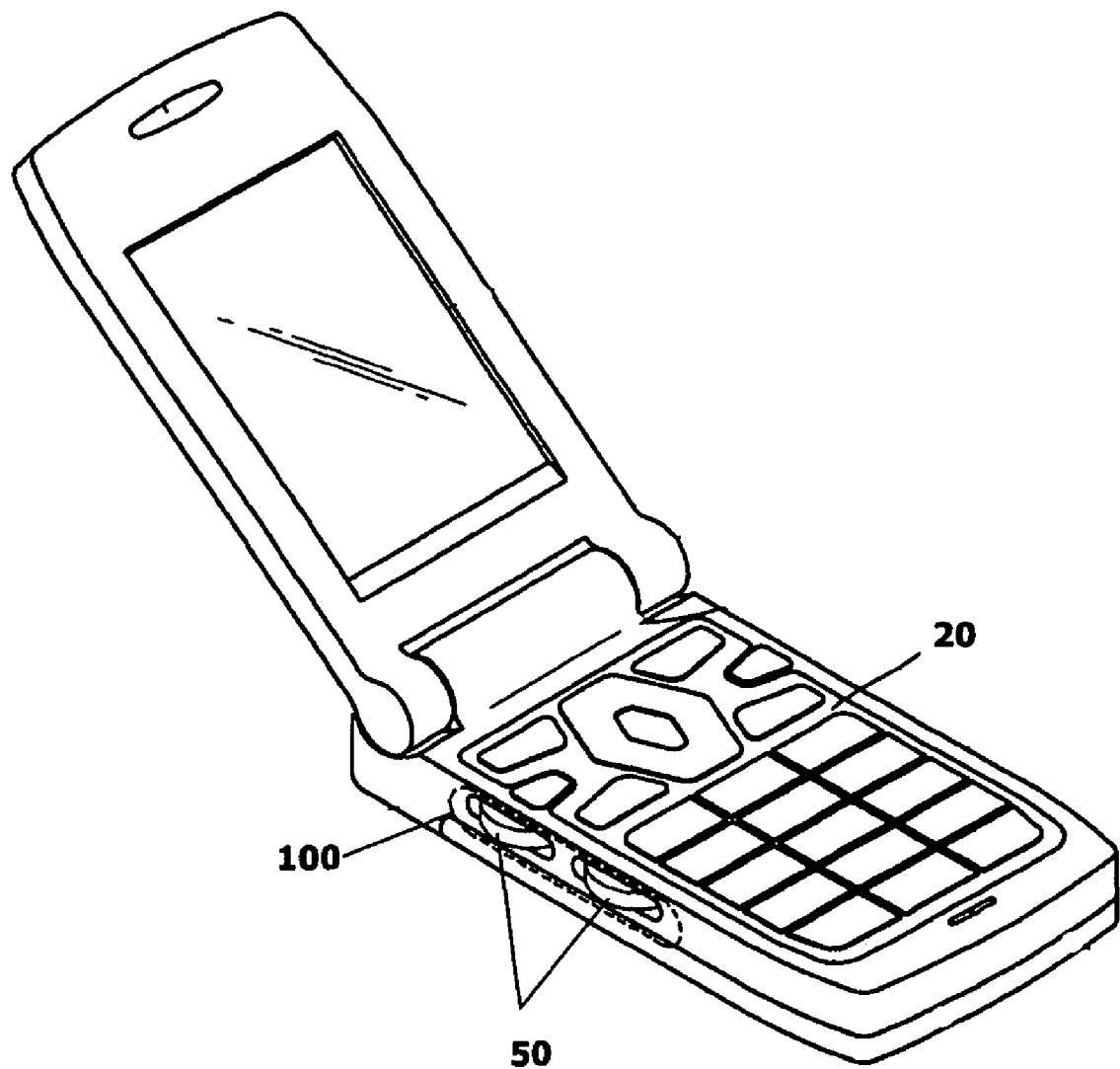
FIG. 5 is a perspective view of a mobile device having an apparatus for sensing a button-pressed state of the mobile device according to an embodiment of the present invention.

While the substrate 11 is not specifically shown in FIG. 4, the rotating member 50 and the contact point rotary 51 may be positioned at an upper surface and a bottom surface of the substrate 11, respectively. A mobile device that includes the apparatus for sensing the button-pressed state according to an embodiment of the present invention is illustrated in FIG. 5 and an exemplary operation of such configured apparatus for sensing button-pressed state in the mobile device according to the embodiment of the present invention will now be explained with reference to FIGS. 3 and 4.

When the rotating member 50 of the rotary switch 10 is rotated (intended or not), the contact point rotary 51, which may be fixed to the rotary axis 52, may also rotate. Accordingly, a moving contact point 53a of the contact point switch 53 may be separated from a fixed unit 53c due to the movements of the wings 51a of the contact point rotary 51. The moving unit 53b and the fixed unit 53c may be supported by a support 53d.

As shown in FIG. 4, a GPIO port of the controller 200 may be electrically connected to the moving unit 53b of the contact point switch 53. When the moving contact point 53a is separated from the fixed unit 53c (and thus causing the moving unit 53b to also separate from the fixed unit 53c), a logical voltage transition occurs and the transition, from a low logical state to a high logical state or vice versa, can be recognized by the controller 200. In other words, the switching operation can be recognized by the controller 200.

The controller 200 may recognize the switching operations based on sequential and continuous operations of the plurality of rotary switches 10. For example, the controller 200 may determine a direction of the switching operation based on an operation order of the two rotary switches 10. That is, if a lower rotary switch 10 is operated prior to an upper rotary switch 10, then the controller 200 may determine that an "UP" switching operation is being performed. Conversely, if the upper rotary switch 10 is operated prior to the lower rotary switch 10, then the controller 200 may determine that a "DOWN" switching operation is being performed.

For instance, if the switch unit 100 is mounted in a side surface of the terminal and the user wishes to adjust the volume of the mobile device, the user may push and rotate the rotating members 50 of the rotary switches 10 upward to turn the volume up. Conversely, the user may push rotate the rotating members 50 downward to turn the volume down. In this instance, the two rotary switches 10, which may be positioned adjacent to each other, should be operated sequentially and continuously through operations of the corresponding rotating members 50 to be interpreted as intentional action by the user. In other words, the user should continuously push and rotate both the lower rotating member 50 and the upper rotating member 50 to adjust the volume of the mobile device.

The controller 200 may determine that the UP or DOWN switching operation (or any other operation of switches) is valid only if the two rotary switches 10 are operated within predetermined time frame of each other. For other operations, the controller may determine that the switching operation as being valid only if the two rotary switches are simultaneously operated. The validity of the switching operation may depend on the context/state of the mobile device.

Furthermore, the controller 200 may also check the number of times that the logical state (a connected state between the moving contact) changes, which may continuously occur in the GPIO port in order to prevent a switch malfunction. The controller 200 may determine that the switching operation is valid when the logical state of the switch unit 100 changes more than a predetermined number of times.

That is, the controller 200 may sense the connected state of the contact points of the plurality of rotary switches 10 mounted in the switch unit 100 through an input/output port.

Based on this sensed information, the controller 200 may recognize a rotating direction, an operation order, and the number of rotations of the rotary switches 10. As a result, the controller 200 may then determine the switching operation to be valid only if the two rotary switches are continuously operated in sequence for more than a predetermined number of times in a same direction. When the controller 200 determines that the switching operation is valid (intended), then the corresponding operation may be performed, for example by the controller 200.

In the embodiment shown in FIG. 5, the plurality of rotary switches are shown to be mounted on the lateral surface of the mobile device. However, in another embodiment, the plurality of rotary switches 10 may be mounted at a front surface of the terminal and the switching operations may be determined accordingly.

Indeed, laterally mounted and front surface mounted switches may be combined in a single device. In this instance, the lateral set of switches may be more convenient to determine switching operations for UP and DOWN motions. Similarly, the front surface set of switches may be more convenient to determine switching operations for LEFT and RIGHT motions.

As described so far, in the embodiments of the present invention, by determining whether the switching operations of the rotary switches as being valid (intended) or not and responding accordingly, unnecessary battery power consumption can be effectively reduced. The operations of the rotary switches may be determined to be valid if the rotary switches are simulataneously operated or within a predetermined time frame of each other, in a predetermined sequence and when each rotary switch is rotated more than a predetermined number of times.

It bears repeating that while two rotary switches are illustrated in the figures and explained for simplicity, the invention is applicable to situations in which more than two rotary switches are provided. With more than two rotary switches, reliability may be enhanced since a malfunction to one of the rotary switches may be tolerated. Also more functionalities may be offered with more than two rotary switches depending on the context.

The invention is also applicable in certain situations in which a single rotary switch is provided. With two or more rotary switches, a direction of rotation may be determined based on the sequence of operations of the rotary switches as described above. With a single rotary switch and separate mechanism to determine the direction of rotation may be desired, such as a direction sensor, but the determination of switching operation may be similar. The direction sensor may be located adjacent to the rotary switch. The direction sensor or sensors may also be utilized even if there are more than one rotary switch.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for controlling an operation a mobile terminal, the apparatus comprising:
   a controller configured to detect when a button on the terminal has been pressed, to sense a user directional sliding movement on the terminal, and to perform a first operation on the terminal when, in a specific sequential order, the controller first detects the button on the terminal has been pressed and then senses the user sliding directional movement on the terminal within a predetermined amount of time from each other,
   wherein the controller senses the user directional movement of the terminal has occurred when the user slides a portion of the terminal,
   wherein the portion of the terminal associated with the user directional sliding movement is located at a first portion of the terminal and the button is located at a second portion of the terminal that is different than the first portion of the terminal such that the user performs two distinct operations on the terminal at the first and second portions of the terminal, and
   wherein the user directional sliding movement is performed on a front surface of the terminal and the button is located on a lateral side of the mobile terminal.

2. The apparatus of claim 1, wherein the first portion of the terminal includes a rotary key that the user slides on to rotate the rotary key.

3. The apparatus of claim 1, wherein the first operation corresponds to a power saving operation of a battery included in the mobile terminal.

4. The apparatus of claim 1, wherein the controller performs a second operation different than the first operation when the controller detects the button on the terminal has been pressed and senses the user sliding directional movement on the terminal in a different order than the specific sequential order.

5. A method for controlling an operation a mobile terminal including a controller, the method comprising:
   detecting, via the controller, when a button on the terminal has been pressed;
   sensing, via the controller, a user directional sliding movement on the terminal; and
   performing, via the controller, a first operation on the terminal when, in a specific sequential order, the detecting step first detects the button on the terminal has been pressed and then the sensing step senses the user directional movement on the terminal within a predetermined amount of time from each other,
   wherein the sensing step senses the user directional movement of the terminal has occurred when the user slides a portion of the terminal,
   wherein the portion of the terminal associated with the user directional sliding movement is located at a first portion of the terminal and the button is located at a second portion of the terminal that is different than the first portion of the terminal such that the user performs two distinct operations on the terminal at the first and second portions of the terminal, and
   wherein the user directional sliding movement is performed on a front surface of the terminal and the button is located on a lateral side of the mobile terminal.

6. The method of claim 5, wherein the second portion of the terminal includes a rotary key that the user slides to rotate the rotary key.

7. The method of claim 5, wherein the first operation corresponds to a power saving operation of a battery included in the mobile terminal.

8. The method of claim 5, further comprising:
   performing a second operation different than the first operation when the controller detects the button on the terminal has been pressed and senses the user sliding directional movement on the terminal in a different order than the specific sequential order.

* * * * *